US006316080B1

(12) United States Patent
Hatada et al.

(10) Patent No.: US 6,316,080 B1

(45) Date of Patent: Nov. 13, 2001

(54) FLUID-RELEASABLE IMAGE TRANSFER SHEET

(75) Inventors: Shigeo Hatada; Keishi Taniguchi, both of Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/292,309

(22) Filed: Apr. 15, 1999

(30) Foreign Application Priority Data

Apr. 15, 1998 (JP) ... 10-104747
Jul. 27, 1998 (JP) ... 10-225181

(51) Int. Cl.[7] ... B32B 27/14

(52) U.S. Cl. ... 428/195; 427/149; 347/105; 347/106

(58) Field of Search ... 428/195, 201, 428/212, 220; 427/149; 347/105, 106

(56) References Cited

U.S. PATENT DOCUMENTS 5,958,560 * 9/1999 Ewan ... 428/201

* cited by examiner

*Primary Examiner*—Bruce H. Hess
*Assistant Examiner*—Michael E. Grendzynski
(74) *Attorney, Agent, or Firm*—Oblon, Spivak, McClelland, Maier & Neustadt, P.C.

(57) ABSTRACT

An image transfer sheet (1) includes a support having water permeability, and a releasing layer, an adhesive layer, and an image transfer layer which are overlaid in this order on the support, the surface of the adhesive layer having an inclined-type ball tack value of 6 or less as measured in accordance with a procedure defined in Japanese Industrial Standards (JIS) Z 0237 when the image transfer sheet is immersed in water and the support is peeled away therefrom, and an image transfer sheet (2) includes a support having water permeability, and a releasing layer, an adhesive layer comprising a pressure-sensitive adhesive material, and an image transfer layer which are overlaid in this order on the support, the pressure-sensitive adhesive material having an inclined-type ball tack value of 11 or less as measured in accordance with a procedure defined in Japanese Industrial Standards (JIS) Z 0237. An image formation method and an image transfer method, using any of these image transfer sheets are provided.

38 Claims, No Drawings

FLUID-RELEASABLE IMAGE TRANSFER SHEET

BACKGROUND OF THE INVENTION

1. Field of the Invention

The present invention relates to an image transfer sheet for use in (1) an electrophotographic image formation process comprising a step of electrostatically transferring a toner image to an image transfer material serving as an image receiving material such as a sheet of plain paper, using an electrophotographic copying machine, (2) a thermal image transfer recording method comprising a step of transferring imagewise a thermofusible ink or a sublimable dye, using a printer, and (3) an ink jet printing method comprising a step of imagewise transferring an aqueous ink or a thermofusible ink, using a printer. The above-mentioned electrophotographic copying machine and printers are hereinafter collectively referred to as the copying apparatus.

The present invention also relates to an image transfer sheet on which images are formed by the copying apparatus and from which the images are transferred to other image-receiving members such as a cloth, a canvas, plastic goods, paper, wood, leather, glass, earthenware and metal.

The present invention also relates to an image formation method and an image transfer method, using the above-mentioned image transfer sheet.

2. Discussion of Background

In accordance with the recent spread and development of the copying apparatus, various trials have been made so as to find new applications and uses in the copying apparatus by utilizing its various functions and capabilities other than its originally intended use for reproducing images on a sheet of plain paper.

For example, there has been proposed a new use of the copying apparatus for transferring an image formed by the copying machine to an image-receiving member made of a material such as cloth, leather, canvas, plastics, wood, glass, earthenware of metal, and fixing the image thereto.

The above-mentioned new use is effective for the application to the manufacturing of clothes such as T-shirts, sweat shirts, aprons and jackets, cups, trays, stained glass, panels, and reproduced pictures which are not to be made by mass-production, but made to order, or designed to be sold on a small scale. Further, such demand has greatly expanded because a full-color electrophotographic copying apparatus capable of producing high quality color images is available and high quality images can be easily printed.

As an image transfer sheet for the above-mentioned applications, there is conventionally known an image transfer sheet for the formation of a transferred image thereon, using a thermofusible ink, a sublimable dye or an aqueous ink, as disclosed, for example, in Japanese Laid-Open Patent Application 52-82509. Furthermore, an image transfer sheet provided with an adhesive layer comprising a delayed-tack-type adhesive agent is also known.

The above-mentioned image transfer sheets, however, have a problem that when image transfer is performed, at least either heat or pressure has to be applied to the image transfer sheets and therefore, it is difficult to perform image transfer to a material which is not heat resistant, such as plastics, or an article with a curved surface to which it is difficult to apply uniform pressure.

Japanese Laid-Open Patent Application 8-108610 discloses a water-pressure image transfer sheet comprising a base paper having water permeability, a releasing layer, an adhesive layer, and an image holding layer. When using this water-pressure image transfer sheet, the water-pressure image transfer sheet is immersed in water after the transfer of an image onto the image holding layer, so that the releasing layer is dissolved in water and the base paper is then peeled away from the transfer sheet. Thus, the image holding layer is caused to float on the surface of the water and then transferred to an image receiving material. In this water-pressure image transfer sheet, neither heat nor pressure is required for image transfer. However, this transfer sheet comprising the adhesive layer, which is composed of a one-liquid type thermosetting resin or a rubber-based pressure-sensitive adhesive, so that the adhesion between the transferred image holding layer and the image receiving material is significantly strong, but accurate positional registration of the image holding layer on the image receiving material is difficult at the time of image transfer.

SUMMARY OF THE INVENTION

It is therefore a first object of the present invention to provide an image transfer sheet for which the positional registration with respect to the image receiving material is easy, and which has high adhesion strength between the image transfer sheet and the image receiving material.

A second object of the present invention is to provide an image formation method capable of forming images with excellent image transfer performance with respect to the positional registration thereof to the image transfer material and high adhesion between the images and the image transfer material.

A third object of the present invention is to provide an image transfer method capable of attaining excellent image transfer performance with respect to the positional registration thereof to the image transfer material, with high adhesion between the images and the image transfer material.

The first object of the present invention can be achieved by an image transfer sheet (1) which comprises a support having water permeability, and a releasing layer, an adhesive layer, and an image transfer layer which are overlaid in this order on the support, the surface of the adhesive layer having an inclined-type ball tack value of 6 or less as measured in accordance with a procedure defined in Japanese Industrial Standards (JIS) Z 0237 when the image transfer sheet is immersed in water and the support is peeled away therefrom, and also by an image transfer sheet (2) which comprises a support having water permeability, and a releasing layer, an adhesive layer comprising a pressure-sensitive adhesive material, and an image transfer layer which are overlaid in this order on the support, the pressure-sensitive adhesive material having an inclined-type ball tack value of 11 or less as measured in accordance with a procedure defined in Japanese Industrial Standards (JIS) Z 0237.

In the above image transfer sheets (1) and (2), it is preferable that the image transfer sheet have an adhesion strength of 100 gf/30 mm or more when the image transfer sheet is bonded to a PET film and then peeled away therefrom.

In the above-mentioned image transfer sheet (1), it is preferable that the adhesive layer comprise an acrylic pressure-sensitive adhesive, and in the above-mentioned image transfer sheet (2) it is preferable that the pressure-sensitive adhesive material comprise or be a pressure-sensitive acrylic adhesive.

In the above-mentioned image transfer sheets (1) and (2), it is preferable that the adhesive layer be provided with a dry deposition amount of 1 g/m$^2$ to 30 g/m$^2$.

The second object of the present invention can be achieved by (a) an image formation method of forming a toner image on an image transfer sheet serving as an image receiving material by electrophotography, and fixing the toner image to the image transfer sheet with application of heat and/or pressure, (b) an image formation method of forming an image on an image transfer sheet serving as an image receiving material by transferring a thermofusible ink layer or a sublimable dye imagewise to the image transfer sheet with the application of heat thereto, and (c) an image formation method of forming an image on an image transfer sheet serving as an image receiving material by an ink jet printing method, using an aqueous ink or a thermofusible ink, by using as the above-mentioned image transfer sheet, any of the image transfer sheets (1) and (2) of the present invention is used.

The third object of the present invention can be achieved by (d) an image transfer method of transferring an image formed on an image transfer sheet to an image receiving material, (e) an image transfer method of transferring an image formed on an image transfer sheet to an image receiving material, the image being formed on the image transfer sheet by transferring a thermofusable ink layer or a sublimable dye imagewise to said image transfer sheet with the application of heat thereto, and (f) an image transfer method of transferring an image formed on an image transfer sheet to an image receiving material, the image being formed on the image transfer sheet by an ink jet printing method, using an aqueous ink or a thermofusible ink, by using as the above-mentioned image transfer sheet, any of the image transfer sheets (1) and (2) of the present invention is used.

DESCRIPTION OF THE PREFERRED EMBODIMENTS

As mentioned above, the image transfer sheet (1) of the present invention comprises a support having water permeability, and a releasing layer, an adhesive layer, and an image transfer layer which are overlaid in this order on the support, the surface of the adhesive layer having an inclined-type ball tack value of 6 or less as measured in accordance with a procedure defined in Japanese Industrial Standards (JIS) Z 0237 when the image transfer sheet is immersed in water and the support is peeled away therefrom, and the image transfer sheet (2) of the present invention comprises a support having water permeability, and a releasing layer, an adhesive layer comprising a pressure-sensitive adhesive material, and an image transfer layer which are overlaid in this order on the support, the pressure-sensitive adhesive material having an inclined-type ball tack value of 11 or less as measured in a accordance with a procedure defined in Japanese Industrial Standards (JIS) Z 0237.

In both the image transfer sheets (1) and (2), the image transfer layer can be formed, using an aqueous emulsion, a polymer prepared from at least one monomer such as ethylene, vinyl acetate, acrylic acid, methacrylic acid or acrylate, or a copolymer using at least one of the above-mentioned monomers.

It is preferable that the image transfer layer be provided with a dry deposition amount of 5 $g/m^2$ to 100 $g/m^2$.

As a material for the pressure-sensitive adhesive material for use in the adhesive layer, there can be employed a polymer prepared from at least one monomer such as ethylene, acrylic acid, methacrylic acid or acrylate, or a copolymer using at least one of the above-mentioned monomers.

Furthermore, an aqueous emulsion can be used as a material for the pressure-sensitive adhesive material for use in the adhesive layer.

A solvent type pressure-sensitive adhesive can also be employed in the adhesive layer.

As a material for the releasing layer, water-soluble resin can be employed.

As the releasing layer, for example, a releasing layer provided with a dry deposition amount of 1 $g/m^2$ to 50 $g/m^2$ can be employed in the present invention.

As the support with water permeability, for example, a sheet of paper with a basis weight in a range of 20 $g/m^2$ to 200 $g/m^2$ can be employed in the present invention.

In any of the image transfer sheets (1) and (2) of the present invention with the above-mentioned structures, an image is formed on the surface of the image transfer layer, using toner, an ink, a dye or the like, and then the image transfer sheet is immersed in water, so as to dissolve the releasing layer in the water. Thus, the support is peeled away from the adhesive layer, so that a film-like material composed of the image transfer layer backed with the adhesive layer is obtained. The thus obtained film-like material is applied to an image receiving material, whereby the image transfer is carried out.

The above-mentioned image transfer can be performed easily and neatly when the surface of the adhesive layer is made so as to have an inclined-type ball tack value of 6 or less as measured in accordance with the procedure defined in Japanese Industrial Standards (JIS) Z 0237 when the image transfer sheet is immersed in water and the support is peeled away therefrom, or the pressure-sensitive adhesive material having an inclined-type ball tack value of 11 or less as measured in accordance with a procedure defined in Japanese Industrial Standards (JIS) Z 0237 is used in the adhesive layer, since when the image transfer sheet is immersed in water and the support is peeled away therefrom to obtain the above-mentioned film-like material and the film-like material is provisionally placed on the image receiving material, the film-like material is not easily stuck on the surface of the image receiving material because of the low tack value mentioned above.

In other words, an image transfer sheet which makes it possible to perform easy and neat image transfer in the above-mentioned sense can be produced when the tack value is adjusted in the above-mentioned manner.

It is preferable that the surface of the adhesive layer have an inclined-type ball tack value of 6 or less, more preferably 3 or less, when the image transfer sheet is immersed in water and the support is peeled away therefrom, or it is preferable that the pressure-sensitive adhesive material have an inclined-type ball tack value of 11 or less, more preferably 10 or less, since when the surface of the adhesive layer has an inclined-type ball tack value of more than 6, or when the pressure-sensitive adhesive material has an inclined-type ball tack value of more than 11, the above-mentioned film-like material is easily stuck on the image receiving material when provisionally placed thereon, so that the positional registration of the transferred image becomes difficult. Furthermore, in this case, it is difficult to remove wrinkles formed in the film-like material and bubbles formed between the film-like material and the image receiving material.

The inclined-type ball tack value of the surface of the adhesive layer, when the image transfer sheet is immersed in water and the support is peeled away therefrom is measured as follows:

A sample image transfer sheet is immersed in water at 20° C. for 3 minutes, and the support is peeled away therefrom. This sample image transfer sheet free of the support is allowed to stand at 20° C. 65% (humidity) for one day, and the inclined-type ball tack value of the surface of the adhesive layer is measured in accordance with the procedure as defined in Japanese Industrial Standards (JIS) Z 0237.

The inclined-type ball tack value of the pressure-sensitive adhesive material is measured as follows:

A sample pressure-sensitive adhesive material is coated with a dry deposition amount of 25 g/m$^2$ on a 50 $\mu$m thick PET film, and dried at 110° C. for 60 seconds, and is then allowed to stand at 20° C., 65% (humidity) for 7 days. The inclined-type ball tack value of the thus obtained sample is measured in accordance with the procedure as defined in Japanese Industrial Standards (JIS) Z 0237.

The glass transition temperature and the molecular weight of materials, additives and other compounds used in the adhesive layer have a main effect on the inclined-type ball tack value of the surface of the adhesive layer. The higher the glass transition temperature, and the greater the molecular weight, the lower the inclined-type ball tack value of the surface of the adhesive layer.

A solvent type coating liquid for forming the adhesive layer tends to lower the inclined-type ball tack value of the surface of the adhesive layer in comparison with a water-type coating liquid therefor.

Specific examples of the pressure-sensitive adhesive materials for use in the adhesive layer are rubbed-based pressure-sensitive adhesives such as natural rubber, styrene/butadiene copolymer rubber, polyisobutylene rubber, isobutylene/isoprene copolymer rubber, styrene/isoprene/styrene block copolymer rubber, styrene/butadiene/styrene block copolymer rubber, chloroprene rubber, butadiene/acrylonitrile copolymer rubber, and polybutadiene rubber; acrylic pressure-sensitive adhesives such as polymethyl methacrylate, polyethyl acrylate, polybutyl acrylate, polyoctyl acrylate and copolymers thereof; vinyl-ether-based pressure-sensitive adhesives such as polyvinyl ethyl ether, polyvinyl butyl ether, and polyvinyl isobutyl ether; and silicone-based pressure-sensitive adhesives such as polydimethyl siloxane. Of these pressure-sensitive adhesives, the acrylic pressure-sensitive adhesives are more preferably employed because the acrylic pressure-sensitive adhesives have lower tack values in comparison with those of the rubber-based pressure-sensitive adhesives and are excellent in transparency, whetherability, heat resistance, and solvent resistance, and less expensive in comparison with the silicone-based pressure-sensitive adhesives.

It is preferable that the adhesive layer be provided with a dry deposition amount of 1 g/m$^2$ to 30 g/m$^2$, more preferably 2 g/m$^2$ to 20 g/m$^2$. When the dry deposition amount of the adhesive layer is less than 1 g/m$^2$, the adhesion force of the adhesive layer is insufficient for practical use, while the dry deposition amount of the adhesive layer is more than 30 g/m$^2$, the production cost increases excessively and the pressure-sensitive adhesive used in the adhesive layer oozes therefrom during the preservation of the image transfer sheets, so that the image transfer sheets tend to stick together.

As a matter of course, when the adhesion strength of the adhesive layer is small, it is easy to apply the image transfer layer to the image receiving material, but the image transfer layer tends to be easily peeled away from the image receiving material.

Therefore, it is preferable that the image transfer sheet have an adhesion strength of 100 gf/30 mm or more when the image transfer sheet is bonded to a PET film and then peeled away therefrom in order to have the image transfer sheet have a sufficient adhesion strength for bonding the image transfer sheet firmly to the image receiving material.

It is preferable that the adhesion strength of the image transfer sheet be 100 gf/30 mm or more, more preferably 200 gf/30 mm or more. When the adhesion strength is less than 100 gf/30 mm, the image transfer layer tends to be peeled away from the image receiving material after being bonded thereto.

In the present invention, the above-mentioned adhesion strength is measured as follows:

An A-4 size image transfer sheet of the present invention is cut into three image transfer sheet test samples, each having a width of 7 cm and a length of 29.6 cm. These image transfer sheet test samples are immersed in water at 20° C. for 3 minutes, and then the support is peeled away from each image transfer sheet test sample. These image transfer sheet test samples are then bonded to a 26 $\mu$m thick PET film of which surface is washed with water in advance, in such a manner that the positional registration thereof is made, wrinkles are removed from the bonded image transfer sheet test samples, and bubbles and water are squeezed off from between the bonded test samples and the PET film, using a blade made of rubber. These image transfer sheet test samples bonded to the PET film are allowed to stand at 20° C., 65% (humidity) for one day, and test pieces with a width of 30 mm and a length of about 20 cm are prepared by cutting from the PET film to which the image transfer sheet test samples are bonded.

The thus prepared test pieces are then subjected to a T-shaped peeling, using a tensile strength tester, so as to peel the test sample away from the PET film at a peeling speed of 300 mm per minute.

In the image transfer layer, for example, the following materials can be employed: thermoplastic polyurethane, polyamide, polyester, polyolefin, cellulose derivative such as cellulose nitrate, styrene resins and styrene copolymers such as polystyrene and poly-α-methylstyrene, acrylic resins such as poly(methyl acrylate), poly(methyl methacrylate), poly(ethyl acrylate) and poly(ethyl methacrylate), vinyl copolymers such as vinyl chloride-vinyl acetate copolymer and ethylene-vinyl alcohol copolymer, rosin and rosin ester resins such as rosin-modified maleic acid resin, natural and synthetic rubbers such as polyisoprene rubber and styrene butadiene rubber, a variety of ionomers, epoxy resin and phenolic resin.

The above-mentioned thermoplastic polyurethane can be obtained from a reaction between an isocyanate derivative and a polyol having hydroxyl groups at an end of the molecular thereof. The isocyanate derivative includes, for example, aromatic diisocyanates such as tolylene diisocyanate and diphenylmethane-4,4'-diisocyanate; aliphatic cyclic diisocyanates such as isophorone diisocyanate; and aliphatic diisocyanates such as trimethylene diisocyanate, tetramethylene diisocyanate, hexamethylene diisocyanate and dodecamethylene diisocyanate.

The polyol includes a polyhydroxy compound, such as alkane polyol, polyester polyol, and polyether polyol. Of these polyhydroxy compounds, at least one of the polyhydroxy compounds is used. Examples of the alkane polyols are alkane diols such as 1,5-pentanediol, 1,8-octanediol, 1,10-decanediol and 1,12-dodecanediol.

The polyester polyol includes aliphatic polyester diol, for example, a polyester diol comprising as a constituent unit at least an aliphatic diol or an aliphatic dicarboxylic acid, which will be explained later.

The polyether polyol includes polyether diols, for example, adducts of diethylene glycol, triethylene glycol, polyethylene glycol, tripropylene glycol, polypropylene glycol, or bisphenol A with an alkylene oxide such as ethylene oxide.

The polyamide includes, for example, nylon 6, nylon 11, nylon 12, nylon 13, nylon 610, nylon 612, nylon 616, and mixed nylon prepared, using any of the above nylon materials, such as nylon 6/12.

The polyester includes a polyester comprising as a constituent component at least an aliphatic diol component or an aliphatic dicarboxylic acid component, more preferably, an aliphatic polyester comprising as constituent components both the aliphatic diol component and the aliphatic dicarboxylic acid component. In many cases, a preferable polyester includes a saturated aliphatic dicarboxylic acid component.

Specific examples of the aliphatic diol component for use in the polyester are ethylene glycol, diethylene glycol, triethylene glycol, polyethylene glycol, propylene glycol, dipropylene glycol, tripropylene glycol, polypropylene glycol, 1,3-butanediol, 1,4-butanediol, neopentyl glycol, 1,6-hexanediol, and polymethylene glycol.

Specific examples of the aliphatic dicarboxylic acid component for use in the polyester include unsaturated aliphatic dicarboxylic acids such as maleic acid and fumaric acid; and saturated aliphatic dicarboxylic acids such as succinic anhydride, adipic acid, azelaic acid, sebacic acid, suberic acid and dodecanedioic acid.

The polyolefin includes, for example, polyethylenes such as low-density polyethylene and straight-chain low-density polyethylene, ethylene-butene-1 copolymer, ethylene-(4-methylpentene-1) copolymer, ethylene-vinyl acetate copolymer, ethylene-(meth)acrylic acid copolymer, ethylene-(meth)acrylate copolymer, propylene-butene-1 copolymer, ethylene-propylene copolymer, ethylene-propylene-butene-1 copolymer, and modified polyolefin prepared from maleic anhydride. Preferable polyolefins include the modified polyolefin.

Further, the image transfer layer may further comprise a tackifier, an antioxidant, an ultraviolet absorbing agent, a coloring agent, an antistatic agent, a flame-retardant, wax, plasticizer and/or a filler when necessary.

It is preferable that the image transfer layer be provided with a dry deposition amount of 5 g/m$^2$ to 100 g/m$^2$, more preferably 10 g/m$^2$ to 50 g/m$^2$. When the dry deposition amount of the image transfer layer is less than 5 g/m$^2$, wrinkles are apt to be formed in the image transfer layer due to the insufficient strength thereof, and the image transfer layer tends to be torn when bonded to the image receiving material. On the other hand, when the dry deposition amount of the image transfer layer is more than 100 g/m$^2$, transferred images tend to appear unnatural because the image transfer layer is excessivley thick, and improper transportation of the image transfer sheet tends to take place when used in a copying machine.

The following materials can be used in the releasing layer: synthetic high polymers such as polyvinyl alcohol, polyethylene oxide, polyacrylamide, polyacrylamine, and polyvinyl pyrrolidone; natural starch such as potato starch, tapioca starch, and corn starch, and processed starches prepared by subjecting the above-mentioned starches to an oxidation processing, $\alpha$-transform processing, etherification processing, or esterification processing; cellulose derivatives such as carboxymethyl-cellulose and methylcellulose; protein; gelatine; glue; casein; shellac, gum arabic; and dextrin.

In the present invention, one releasing layer may be provided. In order to improve the surface smoothness of the image transfer layer, a plurality of releasing layers comprising, for example, a water-soluble material and a filler, may be provided.

It is preferable that the releasing layer be provided with a dry deposition amount of 1 g/m$^2$ to 50 g/m$^2$. When the dry deposition amount of the releasing layer is less than 1 g/m$^2$, the support is difficult to be peeled away from the adhesive layer because the support is bonded to the adhesive layer, while when the dry deposition amount of the releasing layer is more than 50 g/m$^2$, a long period of time is required before the releasing layer is dissolved, so that the peeling speed tends to be lowered.

Examples of the support for use in the image transfer sheet of the present invention are sheets of paper, synthetic paper, cloth, non-woven fabric, leather, and a resin such as polyethylene terephthalate, diacetate cellulose, triacetate cellulose, acrylic polymer, cellophane, celluloid, polyvinyl chloride, polycarbonate, polyimide, polyether sulfone, polyethyl ether ketone, polyethylene or polypropylene, and metallic plate and metallic foil. In addition, the above-mentioned support materials may be laminated to prepare a composite sheet, and further, water resistance and electroconductivity may be imparted to the support material by coating or laminating. The material for the support is not particularly limited to the above-mentioned materials.

In particular, a sheet of paper with a basis weight of 20 g/m$^2$ to 200 g/m$^2$ is preferably employed as the support in the present invention from the viewpoints of the cost, the transportation stability in image formation apparatus, and the water permeability thereof.

In the present invention, it is preferable to use an aqueous emulsion as a material for the formation of the image transfer layer and the adhesive layer, and to an aqueous solution for the formation of the releasing layer. This is because the image transfer sheet can be produced. at low cost, without causing any air pollution problem, since no organic solvents are used and accordingly there is no evaporation of any organic solvents. Of course, it is possible to produce the image transfer layer and the adhesive layer, by use of solvent-using materials, with film formation performance and coating performance taken into consideration.

The releasing layer, the adhesive layer and the image transfer layer can be formed by dissolving or dispersing the materials for each of the above layers in water or an appropriate solvent, or by forming an emulsion of the materials, thereby obtaining a coating liquid for the formation of the releasing layer or the image transfer layer. The thus prepared coating liquid may be coated on the support, using a coater such as roll coater, blade coater, wire bar coater, air-knife coater, rod coater, or die coater. Alternatively, the releasing layer or the transfer layer may be overlaid on the support using a hot-melt coater or a laminate coater.

Images can be formed on the image transfer sheet of the present invention, not only by the electrophotographic recording method, the thermal image transfer recording method using a thermofusible ink or sublimation-type dye, and the ink-jet printing method, as mentioned above, but also by various printing processes such as offset printing, letterpass printing, intaglio printing and stencil printing, and various recording methods such as electrostatic recording, dot impact recording and handwriting.

Other features of this invention will become apparent in the course of the following description of exemplary embodiments, which are given for illustration of the invention and are not intended to be limiting thereof.

EXAMPLE 1

Formation of Releasing Layer

The following components were mixed to prepare a coating liquid for the formation of a releasing layer:

| | Parts by Weight |
|---|---|
| Polyvinyl alcohol ("KL-506" (Trademark), made by Kuraray Co., Ltd.) | 20 |
| Water | 80 |

Using a wire bar, the above prepared coating liquid for the formation of the releasing layer was coated on one side of a sheet of high quality paper with a basis weight of 93 $g/m^2$ serving as a support, and dried. Thus, a releasing layer with a dry deposition amount of 11 $g/m^2$ was provided on the support.

Formation of Adhesive Layer

The following components were mixed to prepare a coating liquid for the formation of an adhesive layer:

| | Parts by Weight |
|---|---|
| 2-ethylhexyl acrylate | 80 |
| Methyl methacrylate | 15 |
| Itaconic acid | 10 |
| Water | 105 |

The above-prepared coating liquid for the formation of the adhesive layer was coated on the release layer by a wire bar, and dried, so that an adhesive layer with a dry deposition amount of 8 $g/m^2$, with a declined-type ball tack value of the materials for the adhesive layer being 10, was provided on the releasing layer.

Formation of Image Transfer Layer

The following components were mixed to prepare a coating liquid for the formation of an image transfer layer:

| | Parts by Weight |
|---|---|
| Butyl acrylate | 23 |
| Ethyl acrylate | 47 |
| acrylonitrile | 30 |
| Water | 92 |

The above-prepared coating liquid for the formation of the image transfer layer was coated on the adhesive layer by a wire bar, and dried, so that an image transfer layer with a dry deposition amount of 53 $g/m^2$ was provided on the adhesive layer, whereby an image transfer sheet No. 1 of the present invention was prepared.

Using a commercially available color copying machine "PRETER 550" (Trademark), made by Ricoh Company, Ltd., a full-color image was formed on the image transfer layer side of the above prepared image transfer sheet No. 1.

The full-color image thus formed was remarkably clear and of high quality, which was of the same high quality as that of an image formed on a sheet of plain paper for exclusive use for the above-mentioned color copying machine "PRETER 550".

The inclined-type ball tack value of the surface of the adhesive layer of the above prepared image transfer sheet No. 1 of the present invention, which was measured in the above mentioned manner by immersing the image transfer sheet No. 1 in water and peeling the support away therefrom, was 3.

Furthermore, the above prepared image transfer sheet No. 1 of the present invention was immersed in water, and the support was peeled away therefrom, so that a film-like material composed of the adhesive layer and the image transfer layer was obtained. The thus obtained film-like material was placed on an acrylic resin plate in close contact therewith, and the positional registration thereof was made, while removing the wrinkles and bubbles in the above-mentioned manner. The result was that it was possible to smoothly perform the positional registration of the film-like material.

Furthermore, water was removed from the above-bonded image transfer sheet No. 1, using a rubber blade, and the image transfer sheet No. 1 was dried. The result was that the image transfer sheet No. 1 was firmly bonded to the acrylic resin plate.

EXAMPLE 2

The procedure for preparation of the image transfer sheet No. 1 for the present invention in Example 1 was repeated except that the formulation for the adhesive layer in Example 1 was changed as follows:

| | Parts by Weight |
|---|---|
| 2-ethylhexyl acrylate | 45 |
| Butyl acrylate | 20 |
| Vinyl acetate | 18 |
| Ethyl acrylate | 13 |
| Itaconic acid | 4 |
| Toluene | 213 |
| Hexane | 71 |

Thus, an image transfer sheet No. 2 of the present invention was prepared.

The materials for the above adhesive layer had a declined-type ball tack value of 3, and the inclined-type ball tack value of the surface of the adhesive layer, which was measured in the same manner as in Example 1, was 1.

EXAMPLE 3

The procedure for preparation of the image transfer sheet No. 1 of the present invention in Example 1 was repeated except that the formulation for the adhesive layer in Example 1 was changed as follows:

| | Parts by Weight |
|---|---|
| 2-ethylhexyl acrylate | 45 |
| Butyl acrylate | 20 |
| Vinyl acetae | 18 |
| Ethyl acrylate | 15 |

-continued

| | Parts by Weight |
|---|---|
| Itaconic acid | 2 |
| Toluene | 236 |
| Ethyl acetate | 236 |

Thus, an image transfer sheet No. 3 of the present invention was prepared.

The materials for the above adhesive layer had a declined-type ball tack value of 6, and the inclined-type ball tack value of the surface of the adhesive layer, which was measured in the same manner as in Example 1, was 1.

EXAMPLE 4

The procedure for preparation of the image transfer sheet No. 3 of the present invention in Example 3 was repeated except that the dry deposition amount of the adhesive layer was changed to 1 $g/m^2$, whereby an image transfer sheet No. 4 of the present invention was prepared.

The inclined-type ball tack value of the surface of the adhesive layer of the thus prepared image transfer sheet No. 4, which was measured in the same manner as in Example 1, was 1.

EXAMPLE 5

The procedure for preparation of the image transfer sheet No. 3 of the present invention in Example 3 was repeated except that the dry deposition amount of the adhesive layer was changed to 16 $g/m^2$, whereby an image transfer sheet No. 5 of the present invention was prepared.

The inclined-type ball tack value of the surface of the adhesive layer of the thus prepared image transfer sheet No. 5, which was measured in the same manner as in Example 1, was 1.

EXAMPLE 6

The procedure for preparation of the image transfer sheet No. 3 of the present invention in Example 3 was repeated except that the dry deposition amount of the adhesive layer was changed to 0.1 $g/m^2$, whereby an image transfer sheet No. 6 of the present invention was prepared.

The inclined-type ball tack value of the surface of the adhesive layer of the thus prepared image transfer sheet No. 6, which was measured in the same manner as in Example 1, was 1.

COMPARATIVE EXAMPLE 1

The procedure for preparation of the image transfer sheet No. 1 of the present invention in Example 1 was repeated except that the formulation for the adhesive layer in Example was changed follows:

| | Parts by Weight |
|---|---|
| 2-ethylhexyl acrylate | 80 |
| Butyl acrylate | 10 |
| Methyl methacrylate | 5 |
| Itaconic acid | 5 |
| Water | 69 |

Thus, a comparative image transfer sheet No. 1 was prepared.

The materials for the above adhesive layer of the above prepared comparative image transfer sheet No. 1 had a declined-type ball tack value of 12, and the inclined-type ball tack value of the surface of the adhesive layer, which was measured in the same manner as in Example 1, was 9.

Each of the above prepared image transfer sheets Nos. 1 to 6 of the present invention, and the comparative image transfer sheet No. 1 was immersed in water at 20° C., and the support was peeled away therefrom, so that a film-like material composed of the adhesive layer and the image transfer layer was obtained. The thus obtained film-like material was bonded to an acrylic resin plate in close contact therewith, and the easiness of the positional registration thereof was evaluated, using three grades.

In addition, each of the above prepared image transfer sheets Nos. 1 to 6 of the present invention and the comparative image transfer sheet No. 1 was immersed in water, and the support was peeled away therefrom to obtain the above-mentioned film-like material. The film-like material was then bonded to a PET film and was allowed to stand for one day and also for 20 days.

The samples which were allowed to stand for one day were subjected to an adhesion strength test, using the above-mentioned tensile strength tester, and the samples which were allowed to stand for 20 days were subjected to an adhesion strength test by manually peeling the film-like material away from the PET film in order to evaluate the adhesion strength of each test sample.

The results are shown in the following TABLE 1:

TABLE 1

| Image Transfer Sheet | Ball Tack Value of Surface of Adhesive Layer | Ball Tack Value of Materials of Adhesive Layer | Adhesion Strength | Easiness of Peeling in 20 Days | Easiness of Positioned Registration |
|---|---|---|---|---|---|
| No. 1 in Ex. 1 | 3 | 10 | 540 | 3 | 3 |
| No. 2 in Ex. 2 | 1 | 3 | 850 | 3 | 3 |
| No. 3 in Ex. 3 | 1 | 6 | 1340 | 3 | 3 |
| No. 4 in Ex. 4 | 1 | 6 | 260 | 3 | 3 |
| No. 5 in Ex. 5 | 1 | 6 | 1640 | 3 | 3 |
| No. 6 in Ex. 6 | 1 | 6 | Too small to measure (less than 50) | 1 | 3 |
| No. 1 in Comp. Ex. 1 | 9 | 12 | 380 | 3 | 2 |

In the above TABLE 1, values of 1, 2 and 3 in Easiness of Positional registration respectively denote as follows:

1: Registration is impossible (none in TABLE 1).

2: Registration is possible, but cannot be carried out smoothly.

3. Registration can be smoothly carried out.

In the above TABLE 1, values of 1, 2 and 3 in Easiness of Peeling in 20 Days respectively denote as follows:

1: Peeling is easy.

2: Image transfer sheet is extended when peeling is tried (none in TABLE 1).

3: Image transfer sheet is torn when peeling is tried.

Japanese Patent Application No. 10-104747 filed Apr. 15, 1998, and Japanese Patent Application No. 10-225181 filed Jul. 27, 1998, are hereby incorporated by reference.

What is claimed is:

1. An image transfer sheet, comprising a support having water permeability, a releasing layer, an adhesive layer, comprising a pressure-sensitive adhesive material, and an image transfer layer which are overlayed in this order on said support, the surface of said adhesive layer having an inclined-type ball tack value of 1 to 3 as measured in accordance with a procedure defined in Japanese Industrial Standard (JIS) Z 0237, when said image transfer sheet is immersed in water and said support is peeled away therefrom; and wherein said adhesive layer is provided with a dry deposition amount of about 1 g/m$^2$ to 20 g/m$^2$.

2. The image transfer sheet of claim 1, wherein said image transfer sheet has an adhesion strength of 100 gf/30 mm or more when said image transfer sheet is bonded to a PET film and then peeled away therefrom.

3. The image transfer sheet of claim 2, wherein said image transfer sheet has an adhesion strength of 200 gf/30 mm or more when said image transfer sheet is bonded to a PET film and then peeled away therefrom.

4. The image transfer sheet of claim 1, wherein said pressure-sensitive adhesive comprises rubber-based pressure-sensitive adhesives, acrylic-based pressure-sensitive adhesives, vinyl-ether-based pressure-sensitive adhesives or silicon-based pressure-sensitive adhesives.

5. The image transfer sheet of claim 4, wherein said pressure-sensitive adhesive comprises acrylic-based pressure-sensitive adhesives.

6. The image transfer sheet of claim 5, wherein said acrylic pressure-sensitive adhesives comprise poly (methylmethacrylate), poly(methylacrylate), poly (ethylacrylate), poly(butylacrylate) or poly(octylacrylate).

7. The image transfer sheet of claim 1, wherein said adhesive layer is provided in a deposition amount of 2 to 20 g/m$^2$ on a dry basis.

8. The image transfer sheet of claim 1, wherein said adhesive layer is provided using a coating liquid in the form of a solvent solution for the formation of said adhesive layer.

9. The image transfer sheet of claim 1, wherein the image transfer layer is provided with a dry deposition amount of 5 g/m$^2$ to 100 g/m$^2$.

10. The image transfer sheet of claim 1, wherein the releasing layer is provided with a dry deposition amount of 1 to 50 g/m$^2$.

11. The image transfer sheet of claim 1, wherein the support having water permeability comprises a sheet of paper having a basic weight in a range of 20 to 200 g/m$^2$.

12. The image transfer sheet of claim 1, wherein the image transfer sheet comprises thermoplastic polyurethane, polyamide, polyester, polyolefin, cellulose nitrate, styrene resins, styrene copolymers, acrylic resins, vinyl copolymers, resin, resin ester resins, natural rubber, synthetic rubber, ionomers, epoxy resins or phenolic resin.

13. The image transfer sheet of claim 1, wherein the releasing layer comprises polyvinyl alcohol, polyethylene oxide, polyacrylamide, polyacrylamine, polyvinyl pyrrolidone, natural starch, processed starch, carboxymethylcellulose, methylcellulose, protein shellac, gum arabic or dextrin.

14. The image transfer sheet of claim 1, wherein the support having water permeability comprises paper, cloth, non-woven fabric, leather, polymer resin, metallic plate or metallic foil.

15. An image formation method, which comprises forming a toner image on an image transfer sheet serving as an image receiving material by electrophotography, and fixing said toner image to said image transfer sheet with the application of heat or pressure or both thereto, said image transfer sheet comprising the image transfer sheet of claim 1.

16. The image formation method of claim 15, wherein said image transfer sheet has an adhesion strength of 100 gf/30 mm or more when said image transfer sheet is bonded to a PET film and then peeled away therefrom.

17. The image formation method of claim 15, wherein said adhesive layer of said image transfer sheet comprises an acrylic pressure-sensitive adhesives.

18. The image formation method of claim 15, wherein said adhesive layer of said image transfer sheet is provided with a dry deposition amount of 1 g/m$^2$ to 30 g/m$^2$.

19. An image formation method, which comprises forming an image on an image transfer sheet serving as an image receiving material by transferring a thermofusible ink layer or a sublimable dye imagewise to said image transfer sheet with the application of heat thereto, said image transfer sheet comprising the image transfer sheet claim 1.

20. The image formation method of claim 19, wherein said image transfer sheet has an adhesion strength of 100 gf/30 mm or more when said image transfer sheet is bonded to a PET film and then peeled away therefrom.

21. The image formation method of claim 19, wherein said adhesive layer of said image transfer sheet comprises and acrylic pressure-sensitive adhesive.

22. The image formation method of claim 19, wherein said adhesive layer of said image transfer sheet is provided with a dry deposition amount of 1 g/m$^2$ to 30 g/m$^2$.

23. An image formation method, which comprises forming an image on an image transfer sheet serving as an image receiving material by ink jet printing method, using an aqueous ink or a thermofusible ink, said image transfer sheet comprising the image transfer sheet of claim 1.

24. The image formation method of claim 23, wherein said image transfer sheet has an adhesion strength of 100 gf/30 mm or more when said image transfer sheet is bonded to a PET film and then peeled away therefrom.

25. The image formation method of claim 23, wherein said adhesive layer of said image transfer sheet comprises an acrylic pressure-sensitive adhesive.

26. The image formation method of claim 23, wherein said adhesive layer of said image transfer sheet is provided with a dry deposition amount of 1 g/m$^2$ to 30 g/m$^2$.

27. The image transfer method, which comprises transferring an image formed on an image transfer sheet to an image receiving material, the image transfer sheet comprising the image transfer sheet of claim 1.

28. The image transfer method of claim 27, wherein said image transfer sheet has an adhesion strength of 100 gf/30 mm or more when said image transfer sheet is bonded to a PET film and then peeled away therefrom.

29. The image transfer method of claim 27, wherein said adhesive layer of said image transfer sheet comprises an acrylic pressure-sensitive adhesive.

30. The image transfer method of claim 27, wherein said adhesive layer of said image transfer sheet is provided with a dry deposition amount of 1 g/m$^2$ to 30 g/m$^2$.

31. An image transfer method, which comprises transferring an image formed on an image transfer sheet to an image receiving material, the image being formed on said image transfer sheet by transferring a thermofusible ink layer or a sublimable dye imagewise to said image transfer sheet with the application of heat thereto, the image transfer sheet comprising the image transfer sheet of claim 1.

32. The image transfer method of claim 31, wherein said image transfer sheet has an adhesion strength of 100 gf/30 mm or more when said image transfer sheet is bonded to a PET film and then peeled away therefrom.

33. The image transfer method of claim 31, wherein said adhesive layer of said image transfer sheet comprises an acrylic pressure-sensitive adhesive.

34. The image transfer method of claim 31, wherein said adhesive layer of said image transfer sheet is provided with a dry deposition amount of 1 $g/m^2$ to 30 $g/m^2$.

35. The image transfer method, which comprises transferring an image formed on an image transfer sheet to an image receiving material, said image being formed on said image transfer sheet by an ink jet printing method, using an aqueous ink or a thermofusible ink, said image transfer sheet comprising the image transfer sheet of claim 1.

36. The image transfer method of claim 35, wherein said image transfer sheet has an adhesion strength of 100 gf/30 mm or more when said image transfer sheet is bonded to a PET film and then peeled away therefrom.

37. The image transfer method of claim 35, wherein said adhesive layer of said image transfer sheet comprises an acrylic pressure-sensitive adhesive.

38. The image transfer method of claim 35, wherein said adhesive layer of said image transfer sheet is provided with a dry deposition amount of 1 $g/m^2$ to 30 $g/m^2$.

* * * * *

UNITED STATES PATENT AND TRADEMARK OFFICE
CERTIFICATE OF CORRECTION

PATENT NO. : 6,316,080 B1
DATED : November 13, 2001
INVENTOR(S) : Shigeo Hatada et al.

It is certified that error appears in the above-identified patent and that said Letters Patent is hereby corrected as shown below:

Column 5,
Line 54, "while the dry" should read -- while when the dry --.

Column 8,
Line 38, "be produced. at low" should read -- be produced at low --.

Column 10,
Line 65, "Vinyl acetae" should read -- Vinyl acetate --.

Column 13,
Line 58, "protein shellac," should read -- protein, shellac, --.

Column 14,
Line 10, "adhesives" should read -- adhesive --;
Line 19, "sheet claim 1." should read -- sheet of claim 1. --
Line 26, "and acrylic" should read -- an acrylic --.

Signed and Sealed this

Twenty-third Day of April, 2002

*Attest:*

JAMES E. ROGAN

*Attesting Officer*

*Director of the United States Patent and Trademark Office*